United States Patent Office 2,994,394
Patented Aug. 1, 1961

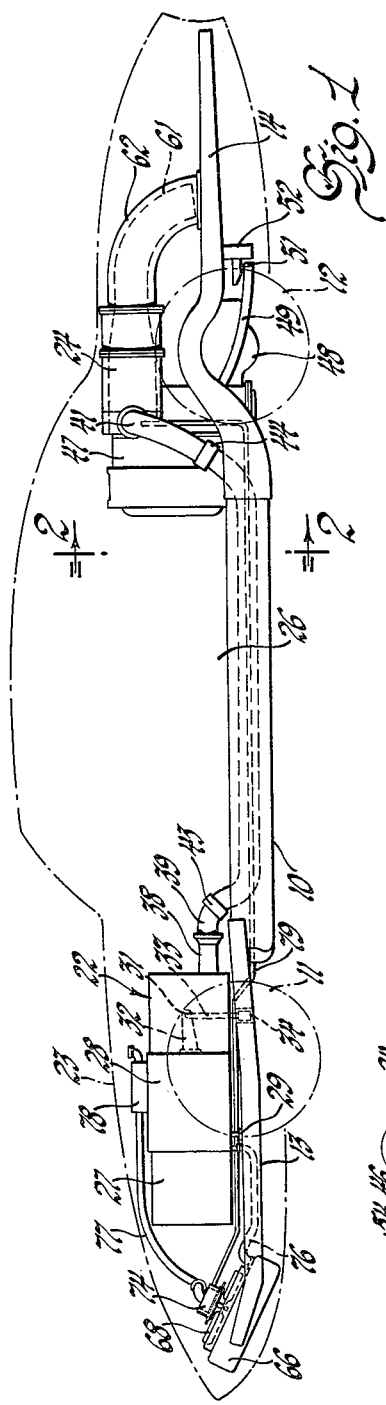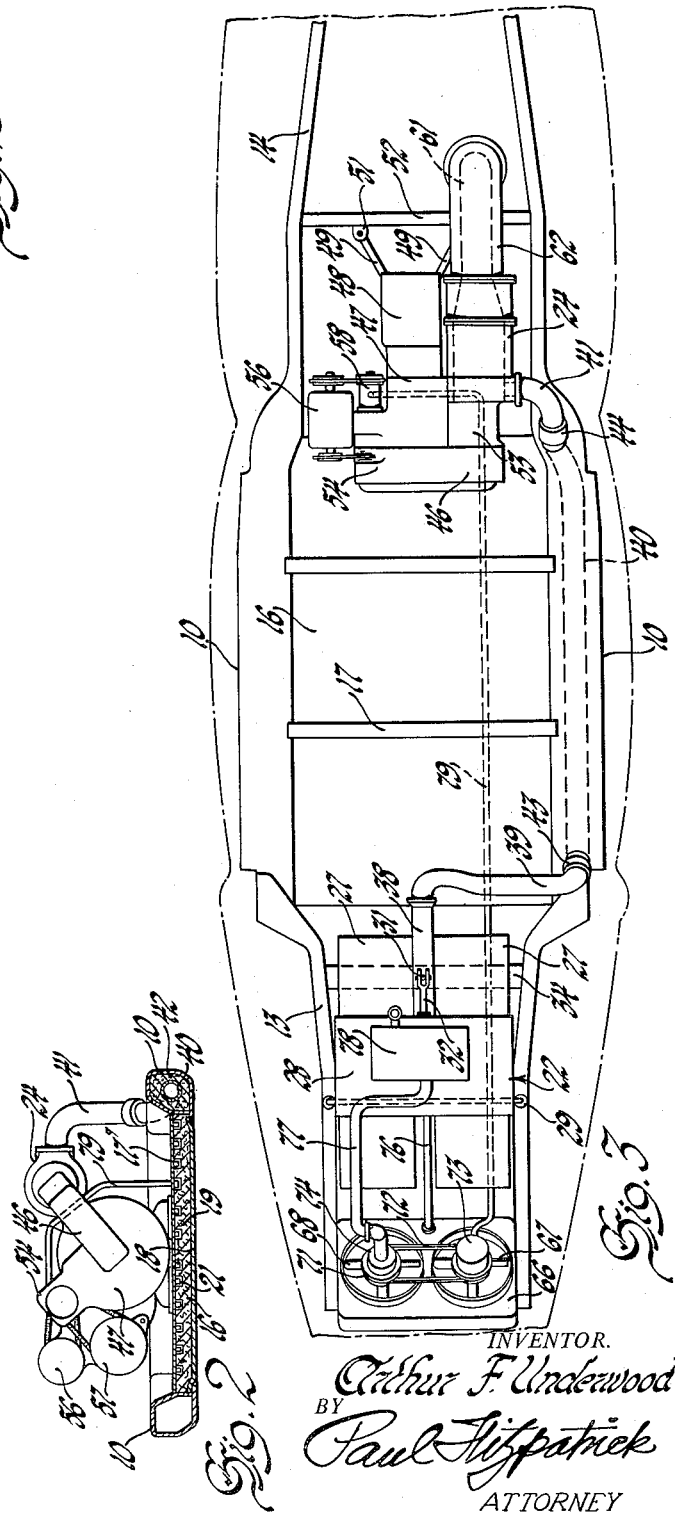

2,994,394
GAS TURBINE AUTOMOBILE
Arthur F. Underwood, Rochester, Mich., assignor to General Motors Corporation, Detroit, Mich., a corporation of Delaware
Filed May 14, 1956, Ser. No. 584,555
2 Claims. (Cl. 180—66)

This invention relates to gas turbine automobiles, and is primarily concerned with a particularly advantageous arrangement of the power plant thereof.

The invention is illustrated herein in terms of its preferred embodiment in an automobile propelled by a free piston gas generator-gas turbine power plant. In general terms, the installation comprises a gas generator mounted at the front of the vehicle, in the usual location of an automobile engine, a gas turbine and driving gear mounted adjacent to rear wheels behind the seating space, and a turbine motive fluid conduit extending along the side of the car.

Such an arrangement provides favorable weight distribution, permits a flat low floor in the passenger space, and favors attractive proportioning and styling of the car.

The nature of the invention and the advantages thereof will be more fully apparent to those skilled in the art from the succeeding description of the preferred embodiment of the invention and the accompanying drawings thereof, in which:

FIG. 1 is a side elevation of the automobile chassis, the body being outlined in broken lines;

FIG. 2 is a vertical sectional view taken on the plane indicated in FIG. 1; and

FIG. 3 is a plan view.

The automobile is preferably of integral body-frame construction, the frame including tubular side rails 10 extending between front wheels 11 and rear wheels 12. Box section forward frame members 13 and rear frame members 14 fixed to side rails 10 continue to the front and rear ends of the vehicle. A floor pan 16 welded to rails 10 defines the floor of the passenger compartment. Transverse stiffeners 17 of U-section reinforce the floor pan, which comprises upper and lower plates 17' and 18, the space between the plates being filled with rigid foam 19. Channels 21 welded to the underside of plate 17', extending longitudinally of the floor, reinforce the floor plate and provide ducts for wiring and hydraulic lines.

The power plant comprises a gas generator 22 under the hood 23 between the front wheels and a turbine 24 behind the seating space 26 geared to the rear wheels.

The gas generator is a two-cylinder Siamesed free piston engine having parallel cylinders extending longitudinally of the car side by side. The configuration of engine is of acceptable length and, being flat, may be mounted on top of frame rails 13 below a low hood. The cylinders 27 are mounted in and on a rigid engine case 28 serving as an air box for the engine.

The gas generator 22 is supported at three points on the frame, a forward support 29 at each side of the rails 13 and a rear support 31 on the vehicle centerline. Rear support 31 comprises a bracket 32 fixed to the case 28 and extending between the cylinders and an upright 33 coupled to bracket 32 and supported on a frame cross member 34. All three supports include conventional rubber shock mounts.

The engine exhaust pipe or manifold 38 is connected through a motive fluid conduit comprising sections 39, 40, and 41 to the turbine 24. Section 40 extends through the left side rail 10 and is surrounded by granular heat insulating material 42. Expansion joints 43 and 44 connect the three conduit sections. It will be apparent this puts the gas conduit out of the way of the passengers, eliminating any tunnel in the car floor.

The power train driving the rear wheels comprises, in addition to turbine 24, a reduction gear 46, a transmission 47, and a differential 48, all these being bolted together into a rigid assembly supported on the frame at three points. Rear support arms 49 extending rearwardly from the differential case 48 are supported at each side of the car centerline by shock mounts 51 on a frame cross member 52. Transmission case 47 is bolted to the front of differential housing 48. The case of turbine 24 is bolted to an upwardly and laterally extending portion 53 of the transmission case. The turbine shaft (not illustrated) extends through portion 53 into reduction gear case 46, which contains speed reducing gearing the output of which feeds into the front end of the transmission.

The turbine, reduction gearing, transmission, and differential may all be of known and conventional types, and the details thereof, which are immaterial to the invention are omitted. The front end of the transmission is supported on the rear end of the floor pan 16 to provide a third point of support for the assembly.

The rear wheels are independently suspended and driven through universal-jointed shafts (not shown) from the differential. The details of this structure and the front suspension are omitted from this specification as immaterial to the invention.

The rear power assembly train also provides means for driving all engine and vehicle accessories. An upward and rightward extension 54 of the reduction gear case contains conventional gearing for power take-off for such accessories as a vehicle service generator 56 and a hydraulic pump 57 for power steering and other uses. These devices may be mounted on the power train assembly and driven by the usual V-belts and pulleys from the gear trains in case 54 and in the transmission.

One accessory device driven by the rear power train is a high pressure hydraulic pump 58 provided to furnish power to the cooling system for the gas generator. Since the free piston gas generator has no constantly rotating shaft, it is ill-adapted to drive its own accessories.

The exhaust from the turbine is carried rearwardly and discharged under the car by an exhaust duct 61 bolted to the turbine case. The turbine case and exhaust duct are enclosed in a tubular jacket 62 through which air is circulated by a small centrifugal fan (not shown) to reduce heat radiation from these hot parts.

The gas generator 22 is an opposed-piston engine of diesel type, and is water-jacketed for cooling. The engine cooling water is cooled by a radiator 66 mounted at the front of the car at about 30° to the horizontal between the front ends of frame members 13. Air is drawn through the radiator by two fans 67 and 68 suitably supported above the radiator. The fan shafts mount pulleys 71 connected by a V-belt 72. A hydraulic motor 73 drives the shaft of fan 67, and that of fan 68 through belt 72. A water circulating pump 74 is driven by the shaft of fan 68. Pump 74 draws water from the engine through hose 76, and radiator 66 and returns it through hose 77 to a water tank 78 from which it flows into the engine.

Motor 73 is energized by fluid supplied by pump 58 through a line 79 which may be run through one of the floor pan channels 21. A return line (not shown) may be similarly disposed, or both lines may be run through the right frame rail 10.

The details of the gas generator structure are omitted from this specification as immaterial to the invention.

It will be apparent from the foregoing description that the invention provides a highly advantageous power plant installation for a gas turbine automobile. The location of the gas generator at the front of the vehicle and the power turbine and drive train at the rear provides good weight distribution and a clear passenger compartment with a low flat floor. The low height of the free piston gas generator and the acute angle of the radiator make possible a low hood line sloping off to the front as indicated by the broken outline. The mechanical components are all freely accessible and readily removable. The power turbine and hydraulic transmission provide a simple and practicable drive for the gas generator cooling system.

The free piston type of gas generator facilitates separating the gas generator and power turbine and the installation of the motive fluid conduit because of the moderate temperature of the motive gas.

The foregoing detailed description of the preferred embodiment of the invention to explain the principles thereof is not to be taken as limiting the invention, as modifications may be made by the exercise of skill in the art within the scope of the invention.

I claim:

1. An automotive vehicle comprising, in combination, a chassis providing a passenger space in the longitudinally central portion thereof, a free piston gas generator mounted on the chassis at one end thereof, a turbine and power transmission means for driving the vehicle mounted on the chassis at the other end thereof, the passenger space being disposed between the gas generator and turbine, a motive fluid conduit extending from the gas generator to the turbine outboard of the passenger space, a cooling radiator, a fan for circulating air through the radiator, and a pump for circulating a cooling fluid through the radiator and gas generator, the radiator being mounted in a recumbent attitude between the side rails ahead of the gas generator, driving motor means coupled to the fan and pump, and means driven by the turbine connected to the motor means to supply energy thereto, the recumbent attitude of said radiator together with said gas generator and turbine providing the vehicle with a minimum overall height, the locations of said gas generator, turbine and radiator providing the most efficient weight distribution.

2. An automotive vehicle comprising, in combination, a chassis including side rails and providing a passenger space in the longitudinally central portion thereof, a free piston gas generator mounted on the chassis at the front end thereof, a turbine and power transmission means for driving the vehicle mounted on the chassis at the rear end thereof, the passenger space being disposed between the gas generator and turbine, a motive fluid conduit extending from the gas generator to the turbine outboard of the passenger space through one of the side rails, a cooling radiator, a fan for circulating air through the radiator, and a pump for circulating a cooling fluid through the radiator and gas generator, the radiator being mounted in a recumbent attitude between the side rails ahead of the gas generator, driving motor means coupled to the fan and pump, and means driven by the turbine connected to the motor means to supply energy thereto, the recumbent attitude of said radiator together with said gas generator and turbine providing the vehicle with a minimum overall height, the locations of said gas generator, turbine and radiator providing the most efficient weight distribution.

References Cited in the file of this patent

UNITED STATES PATENTS

| | | |
|---|---|---|
| 2,112,101 | Kliesrath | Mar. 22, 1938 |
| 2,115,124 | Schittke | Apr. 27, 1938 |
| 2,230,760 | Pescara | Feb. 4, 1941 |
| 2,292,288 | Pescara | Aug. 4, 1942 |
| 2,358,663 | Scott-Iversen | Sept. 19, 1944 |
| 2,394,160 | Emmitt | Feb. 5, 1946 |
| 2,550,717 | Polk | May 1, 1951 |
| 2,626,001 | Antle | Jan. 20, 1953 |
| 2,636,814 | Armstrong | Apr. 28, 1953 |
| 2,695,497 | Huber | Nov. 30, 1954 |
| 2,759,327 | Huber | Aug. 21, 1956 |
| 2,854,085 | Bachle | Sept. 30, 1958 |

FOREIGN PATENTS

| | | |
|---|---|---|
| 1,066,674 | France | Jan. 20, 1954 |